Figure 1:
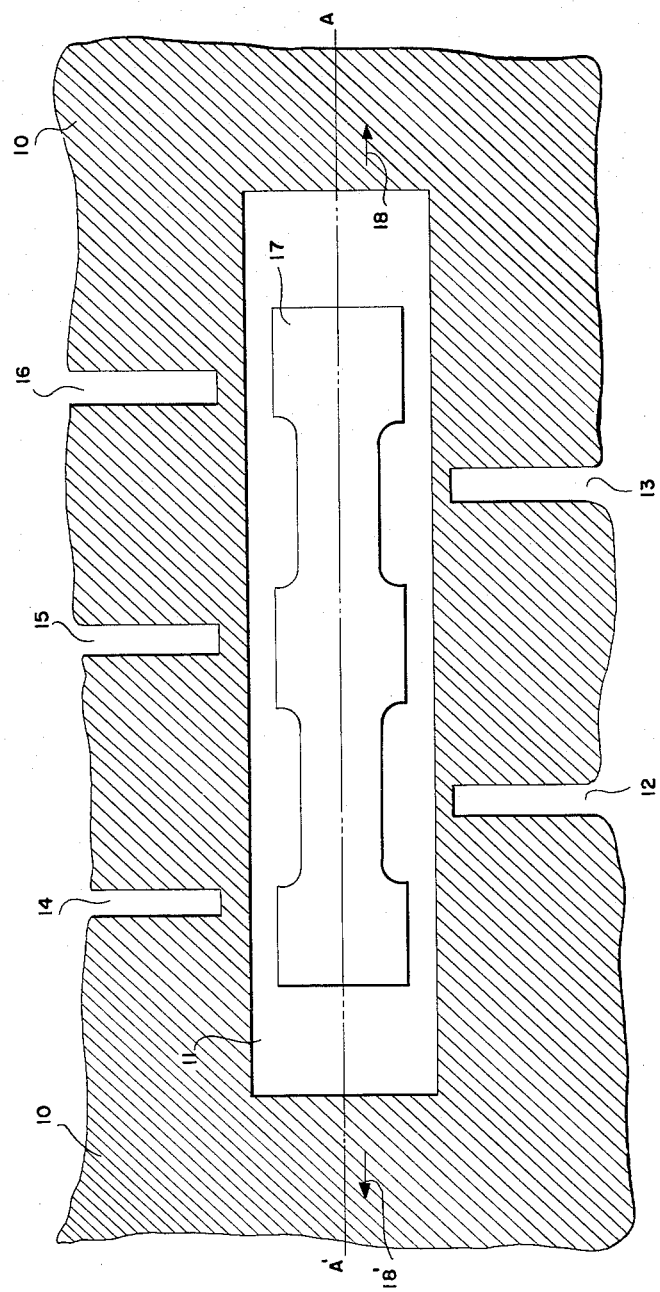

April 26, 1966  J. D. I. LOCKE  3,247,603
MECHANIZED DISPLAY PANELS
Filed Nov. 29, 1962  2 Sheets-Sheet 1

INVENTOR
JOHN D. I. LOCKE

BY *Larson and Taylor*

ATTORNEYS

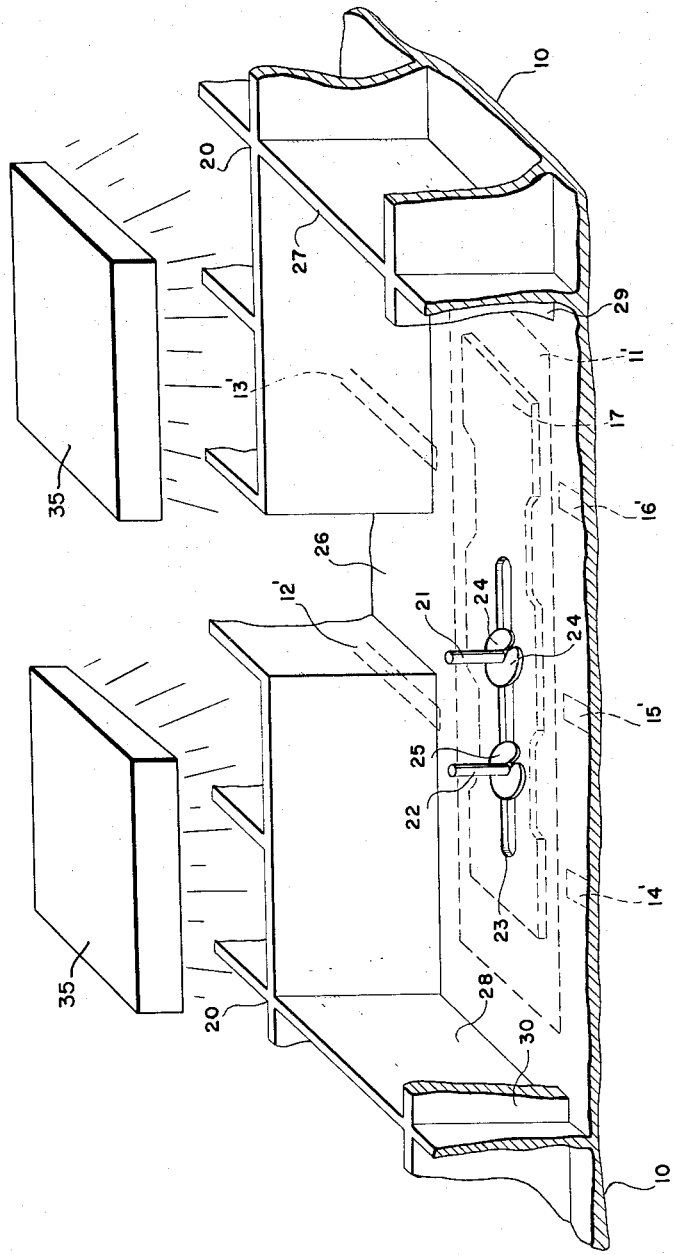

United States Patent Office 3,247,603
Patented Apr. 26, 1966

3,247,603
MECHANIZED DISPLAY PANELS
John David Ivor Locke, Southsea, England, assignor to Communications Patents Limited, London, England
Filed Nov. 29, 1962, Ser. No. 240,977
Claims priority, application Great Britain, Jan. 19, 1962, 2,071/62
6 Claims. (Cl. 35—13)

This invention relates to mechanized display panels such as are used in classroom training aids, for example, classroom training aids by which the operation of complex mechanical systems of an aircraft may be demonstrated to students.

Instructions in such complex systems can best be given by the use of a classroom training aid which is a self-explanatory, diagrammatic, working model of the aircraft system concerned, arranged on a display panel so that it can be used for class or group instruction. Examples of such system trainers are working models of the hydraulic power system of an aircraft, the landing gear of an aircraft, and the aileron and spoiler system of an aircraft.

The display panel incorporates back lighting to indicate different operating conditions. For example, lines and areas indicating the hydraulic fluid in a hydraulic system may be illuminated so as to be green in colour when the hydraulic pressure is low and to change to red as the hydraulic pump of the system begins to operate. Means for providing back-lighting of a display panel in this manner are described in our co-pending applications Nos. 24,424/61 and 46,715/61.

In such display panels, it is often necessary to include parts which are movable in relation to a diagram in a manner not involving angular rotation, to show, for example, the opening and closing of hydraulic valves or the operation of actuators.

It is an object of the present invention to provide, in a mechanized display panel, an improved method of retaining movable parts in relation to the display panel and means whereby such movable parts may readily be coupled to operating mechanisms.

According to one aspect of the present invention, a display panel adapted for illustrating the mechanical elements of a system and their operation, comprises a supporting panel part carrying a representation of the elements illustrated, at least one displaceable part shaped to represent a movable element of the system, the said part being slidably mounted for movement along a slot in the supporting panel part and being retained therein by one or more retaining members.

According to another aspect of the present invention, a method of producing a display panel adapted for illustrating the mechanical elements of a system and their operation, comprises the steps of shaping a displaceable part to represent a movable element of the system, slotting a supporting portion of the display panel so that the sides of the slot lie parallel to the direction of movement of the movable element, providing the displaceable part with a guide member or members to permit longitudinal movement of the said part in the slot but to prevent lateral or rotational movement therein and providing a retaining member or members to retain the displaceable part in relation to the slot.

In order that the invention may be readily carried into effect, one embodiment thereof will now be described in detail, by way of example, with reference to the accompanying drawings, in which:

FIG. 1 is a fragmentary front view of a display panel carrying a movable unit representing, in the example chosen, the piston of a "spool" type hydraulic valve, and FIG. 2 is a fragmentary back view of the panel showing parts whereby the movable unit is retained in slidable relationship to the panel.

In FIG. 1, the translucent screen 10 of a display panel is painted, on the front face, in a manner to leave unobscured an area 11 representing the cylinder of a hydraulic valve, and areas 12 to 16 representing pipes through which liquid flows to and from the cylinder of the valve. In the figure, cross hatching is used to indicate the painted areas. A piston within the cylinder of the valve, represented by unit 17, is mounted on the surface of the screen. The unit 17 is made of opaque sheet material and is shaped so that its profile corresponds to the outline view of the piston of the valve. The unit is mounted to move from a neutral position, on center line A, A', in the direction indicated by the arrows 18, 18'.

The operation of the valve is indicated by back-lighting 35 of the panel, so that the pipes are illuminated so as to be white or red in colour, thereby to show respectively flow of liquid through the valve in the directions to and from a reservoir situated on a part of the panel which is not shown. In the neutral position, the pipe 15 is illuminated so as to be red. With the piston moved in the direction of the arrow 18, pipes 15 and 12 are illuminated to be red and pipes 13 and 16 are illuminated to be white. With the piston moved in the direction of the arrow 18', pipes 15 and 13 are illuminated to be red and pipes 12 and 14 are illuminated to be white.

Referring to FIG. 2, the screen of FIG. 1, indicated by reference 10, as in FIG. 1, has a cellular grid 20 secured thereto, to enable unobscured areas on the screen to be illuminated in different colours, using light bulbs disposed in compartments of the grid, in a manner well-known. Unobscured areas representing the cylinder and pipes 11 to 16 of FIG. 1, are shown within broken outlines 11' to 16' respectively.

Compartment walls of six compartments of the grid are removed so that mechanisms, used to provide movement of the unit 17, can be accommodated at the rear of the display panel. This mechanism is not part of the present invention and is therefore not described in detail in the present specification. For the sake of clarity, compartment walls between walls 29 and 30 are not shown in the diagram.

In FIG. 2 the unit representing the piston is shown by broken outline 17, using the same reference number as in FIG. 1.

Pillars 21 and 22 are attached to a rear face of the unit 17, perpendicular to the surface and on the center line A, A' of the unit. The unit 17 is mounted on the panel with the pillars 21 and 22 in a slot 23 cut in the screen 10 and with the free ends of the pillars protruding from the back face of the screen. The slot is cut in the screen with its sides parallel to the axis of movement of the unit 17 and in a position such that the unit is correctly positioned within the area 11. The diameter of the pillars and the width of the slot are such that the unit is permitted to slide freely from side to side without undue play.

The spacing of the pillars 21 and 22 in relation to the length of the slot 23 may serve to limit the lateral motion of the unit 17 by abutment of the pillars against the ends of the slot.

The unit 17 is retained with its rear face in near contact with the front face of the screen by "C" type washers, 24, 25, clipped into circumferential grooves in the protruding parts of the pillars 21 and 22.

Referring to FIGS. 1 and 2, the unit 17 is actuated by a mechanism, which is not shown, accommodated at the rear of the display panel.

In one preferred arrangement, an electric motor and reduction gear assembly is located in compartment 26. To an output shaft of the assembly is coupled a lever provided with a slot which engages the pillar 21. The driving motor is fed with current via switching means, so that the output shaft is controlled to rotate from a midposition through a few degrees in clockwise or anticlockwise directions and hence to move the piston from a neutral position, by a small amount, in directions indicated by the arrow 18 or the arrow 18'.

In another arrangement, solenoids are used to actuate the unit 17. The pillar 21 is coupled to the armature of a first solenoid, mounted on a compartment wall 27 of the grid 20, and the pillar 22 is coupled to a second solenoid mounted on a compartment wall 28 of the grid 20.

The solenoids are supplied with current via a multiposition switch, to cause the piston to move from a neutral position in the direction indicated by arrow 18, if the switch is in a first position, and in the direction indicated by arrow 18', if the switch is in a second position. No current is supplied to the solenoids with the switch in a mid-position. The piston is returned to a neutral position by springs incorporated in the solenoid mechanism.

In the example described, the movable unit is retained by two pillars each provided with retaining parts. Where small movements only are involved, it is sometimes sufficient to use one pillar and retaining part only. The single pillar is coupled to an operating mechanism in the normal way and a guide pin is used in place of the second pillar to maintain the desired direction of movement of the movable unit.

It will be appreciated that retaining arrangements, not involving the use of "C" type washers, may be used. For example, a washer and a spiral spring may be used, these being assembled onto the protruding part of the pillar and held thereon by a split pin inserted in a diametrical hole in the pillar. Alternatively, a portion of the pillar may be threaded to enable the washer and spring to be held in place on the pillar by a nut.

What I claim is:

1. A display panel for illustrating physical elements of a system including at least one stationary element, fluid supply lines connected to said stationary element and at lease one movable element subject to displacement relative to said stationary element in operation of the system, comprising a slotted, translucent support panel carrying applied opaque areas illustrating said stationary element and fluid supply lines connected to said stationary element, a cellular grid behind said support panel, back lighting means in said cellular grid providing a plurality of different lighting modes to indicate different operating conditions, an opaque displaceable member illustrating said movable element, support means attached to said displaceable member and extending through the slot in said slotted panel, said support means and said panel slot cooperating to permit longitudinal movement of said displaceable member relative to said slot and to prevent lateral movement and rotational movement of said displaceable member, and operating means attached to said displaceable member extending through said slot to the rear of said support panel for coupling to mechanical drive means.

2. A display panel as claimed in claim 1, in which said support means for said displaceable member comprises a plurality of support pillars at least one of which serves as said operating means.

3. A display panel as claimed in claim 2, in which said support pillars carry retaining means for retaining said displaceable member in near contact with the front face of said support panel.

4. A display panel as claimed in claim 1, in which said back lighting means provide different lighting modes by different colors of said fluid supply lines.

5. A display panel as claimed in claim 1, in which said cellular grid defines regular rectilinear cells with a cutaway portion in the region of said applied opaque areas.

6. A display panel as claimed in claim 1, in which said support panel and said cellular grid form a unitary structure.

References Cited by the Examiner

UNITED STATES PATENTS

| | | | |
|---|---|---|---|
| 508,247 | 11/1893 | Schwab et al. | 35—13 |
| 718,193 | 1/1903 | Colvin | 35—13 |
| 800,000 | 9/1905 | Melrose | 35—13 |
| 1,722,659 | 7/1929 | Clark | 35—13 |
| 2,008,634 | 7/1935 | Aird | 35—13 |
| 2,518,506 | 8/1950 | Thompson | 35—13 X |
| 2,629,941 | 3/1953 | Allgaier | 35—13 |
| 2,722,060 | 11/1955 | Flower et al. | 35—13 |
| 2,952,079 | 9/1960 | Koch | 35—1 |

JEROME SCHNALL, *Primary Examiner.*

GEORGE A. NINAS, JR., LAWRENCE CHARLES, EUGENE R. CAPOZIO, *Examiners.*